(12) United States Patent
Koch et al.

(10) Patent No.: US 7,122,984 B2
(45) Date of Patent: Oct. 17, 2006

(54) METHOD FOR IDENTIFYING AN OVERLOAD CURRENT OF AN ELECTRIC DRIVE

(75) Inventors: Stefan Koch, Kappelrodeck (DE); Nikolas Haberl, Lauf (DE)

(73) Assignee: Robert Bosch GmbH (DE)

( * ) Notice: Subject to any disclaimer, the term of this patent is extended or adjusted under 35 U.S.C. 154(b) by 0 days.

(21) Appl. No.: 10/528,850

(22) PCT Filed: Jun. 27, 2003

(86) PCT No.: PCT/DE03/02144

§ 371 (c)(1),
(2), (4) Date: Mar. 22, 2005

(87) PCT Pub. No.: WO2004/030173

PCT Pub. Date: Apr. 8, 2004

(65) Prior Publication Data

US 2006/0066276 A1    Mar. 30, 2006

(30) Foreign Application Priority Data

Sep. 26, 2002  (DE) .................. 102 45 242

(51) Int. Cl.
*H02K 17/32* (2006.01)
*H02P 7/00* (2006.01)
(52) U.S. Cl. .............. 318/434; 318/254; 318/599
(58) Field of Classification Search ............ None
See application file for complete search history.

(56) References Cited

U.S. PATENT DOCUMENTS

| 4,873,453 A | * | 10/1989 | Schmerda et al. | 307/130 |
|---|---|---|---|---|
| 5,245,523 A | * | 9/1993 | Juzswik | 363/56.03 |
| 5,708,343 A | * | 1/1998 | Hara et al. | 318/599 |
| 5,710,495 A | * | 1/1998 | Skelton | 318/434 |
| 5,742,142 A | * | 4/1998 | Witt | 318/599 |
| 5,811,948 A | * | 9/1998 | Sato et al. | 318/434 |
| 6,054,823 A | | 4/2000 | Collings et al. | |
| 6,414,459 B1 | * | 7/2002 | Borho et al. | 318/599 |
| 6,512,346 B1 | * | 1/2003 | Yoshimura | 318/599 |
| 6,759,820 B1 | * | 7/2004 | Karwath | 318/254 |
| 6,825,625 B1 | * | 11/2004 | Karwath et al. | 318/434 |
| 6,891,342 B1 | * | 5/2005 | Nakamura et al. | 318/77 |
| 6,960,896 B1 | * | 11/2005 | Shu et al. | 318/432 |
| 2003/0015979 A1 | * | 1/2003 | Karwath | 318/254 |
| 2005/0134244 A1 | * | 6/2005 | Sanzo et al. | 323/283 |

FOREIGN PATENT DOCUMENTS

| DE | 19732094 | 1/1999 |
|---|---|---|
| DE | 19732098 | 1/1999 |
| EP | 0572162 | 12/1993 |

* cited by examiner

*Primary Examiner*—Paul Ip
(74) *Attorney, Agent, or Firm*—Michael Best & Friedrich LLP

(57) ABSTRACT

The invention relates to Method to detect a sluggishness or the blocking of an electric drive (3), which is triggered via a power semiconductor component (7). The electric drive (3) can be operated in both a partial load range (PWM timing signal<100%) as well as in a full load range (PWM timing signal=100%), but always as a function of the timing of the PWM signal (29, 30). An evaluation circuit (37) is connected with a micro-controller (25). Pulses generated within a time interval are detected in the evaluation circuit (37) from the current I flowing via the first power semiconductor component (7) and the number of detected pulses A1*, A2* are compared with a to-be-expected number of pulses A1, A2.

17 Claims, 2 Drawing Sheets

METHOD FOR IDENTIFYING AN OVERLOAD CURRENT OF AN ELECTRIC DRIVE

BACKGROUND OF THE INVENTION

High cooling power must be produced in motor vehicles with combustion engines even at low speeds. To do this, fans are used as a rule, which induce heat dissipation when the air stream at low vehicle speeds is no longer adequate to dissipate heat from the radiator. One-piece plastic cooling fans are normally used in passenger vehicles and these are also increasingly being used for heat dissipation in commercial vehicles.

Nowadays, direct-current motors (DC motors) are being used on cooling fans in combustion engines, and these motors drive the fan wheel of the fan, if need be with the interconnection of a coupling. The electric drives used are triggered via power controls, for which a timing of the supply voltage takes place at a frequency above 15 kHz. The timing of the supply voltage occurs via pulse width modulation, whereby the pulse width ratio, i.e., the pulse interval length between the triggering pulses, can be lengthened or shortened, thereby permitting the terminal voltage on the terminals of the electric drives that are used to be varied in a wide range. By varying the terminal voltage at the terminals of the electric drives of the cooling fan, the current consumption of the electric drive or the torque of the electric drive can be regulated or preset. In addition, the speed of the electric drives can be adjusted in wide ranges with the aid of the pulse width modulation of the supply voltage. This is of particular interest in cases where the vehicle is driving at a low speed or idling. Then an increase in the speed of the electric drive of the fan wheel can produce adequate heat dissipation at the radiator of the combustion engine if the cooling via the air stream flowing through the radiator is no longer adequate.

The timing of the supply voltage, which is applied to the terminals of the electrical drives, however, makes the use of free-wheeling diodes as well as capacitor elements necessary. Electrolytic capacitors are used as a rule. The free-wheeling diode makes the free-wheel of the electric drive or the electric drives possible, while the electrolytic capacitors make the free-wheel of the supply line possible. So that the electrolytic capacitors operate without any difficulty also at high temperatures and achieve the required service lives, they are normally large dimensioned in terms of capacitance. In addition, it can be necessary to connect two electrolytic capacitors in parallel in order to achieve the desired smoothing of the residual ripple.

DE 197 32 094 A1 relates to a control circuit for a direct-current motor. An electrolytic capacitor is connected in parallel with the direct-current motor. The control circuit features a free-wheeling diode and a reverse battery protective device, which contains a transistor switch with a diode connected in parallel with it. The reverse battery protective device is switched in the electric circuit of the electrolytic capacitor and the free-wheeling diode. The transistor switch is designed as an n-channel power MOSFET and its drain connection lies at the negative connection of the electrolytic capacitor and at the anode of the free-wheeling diode. The free-wheeling diode's cathode lies at the positive side of the direct-current motor. The source connection is attached at the negative side of the direct-current motor and the gate connection is applied via a resistor at a positive voltage.

DE 197 32 098 A1 also relates to a control circuit for a direct-current motor. The direct-current motor is triggered in a timed fashion and includes a parallel-connected electrolytic capacitor as well as free-wheeling diode. In accordance with this attainment, the control emission is reduced by a choke being attached between the positive motor supply voltage and the positive connection of the electrolytic capacitor, and the free-wheeling diode lying with its cathode between the choke and the electrolytic capacitor and with its anode at the negative side of the direct-current motor.

In current designs of fan triggering for motor cooling fans, excess current detection takes place via the detection of a current in the free-wheeling circuit of the electric drive. The measurement of the current in the free-wheeling circuit of the electric drive occurs indirectly via measurement of the induced voltage at the line inductance of the free-wheeling circuit. Moreover, the detection of current in the free-wheeling circuit can be realized via a shunt, which has the disadvantage that dissipation power is generated and therefore the generation of heat occurs. Furthermore, the measurement of current with the use of a shunt is relatively costly. The methods outlined to measure the induced voltage at the line inductance of the free-wheeling circuit are, along with other parameters, a function of the electric wiring and of the switching behavior of the power transistors. Measuring the induced voltage at the line inductance of the free-wheeling circuit is sensitive to interference irradiation, i.e., from electric fields, because of the low voltages and the high-impedance.

SUMMARY OF THE INVENTION

The method proposed in accordance with the invention permits the blocking of an electric drive to be established due to an indirect detection of excess current. A blocking, a sluggishness or the respective speed of the electric drive can be attained via the current or the current form or even from the voltage pulses derived from the current form when triggering a power semiconductor component such as a MOSFET for example.

The electric drive of a motor cooling fan is triggered in a partial load range with a PWM timing signal<100%. In doing so, the pulses of the current within an evaluation circuit, in which a micro-controller ($\mu C$) is accommodated, are counted. In this connection, the evaluation circuit includes a biased comparator, which switches over the output when a threshold input voltage is exceeded. The edge change at the output of the comparator that is subject to bias voltage can be detected by the micro-controller and the number of flank changes can be counted in this.

With normal operation of the electric drive, the number of the edges is $A1$. This value $A1$ represents a reference value. If a number of edges $A1^*$ is detected, which is less than the number of edges occurring with normal operation of the electric drive, there can be a defect at the power semiconductor component (MOSFET), at the electric drive itself or at the electrical connecting lines. Thereupon, the flow of current to the electric drive via the evaluation circuit is halted by switching off the current triggering.

With full triggering of the electric drive with a pulse width modulation timing of 100%, it is possible to switch cyclically to a timing ratio of 99% for a short period of time. A check takes place whether a specific number $A2$ of pulses occur per time segment. If the check of the number of pulses $A2$ per time segment detects a number $A2^*$, which is less than the number $A2$, the conclusion can be drawn that there is a defect at the first power semiconductor element (MOSFET), at the electric drive itself or in the free-wheeling circuit or at the electrical connecting lines and the flow of current to the electric drive is halted.

In addition, a blocking of the electric drive can be detected via the detection of the absolute value of the voltage of the electric drive. When there is blocking of the electric drive, the absolute voltage value exceeds a limit voltage. The amount of absolute value of the voltage can be detected by the micro-controller, which directly thereafter performs a switching off of the power semiconductor component triggering the electric drive. Since the limit voltage of the electric drive is a function of the PWM timing signal and of the supply voltage, an adaptation of the limit voltage by the micro-controller μC can take place as a function of the PWM timing signal and the supply voltage $U_B$.

BRIEF DESCRIPTION OF THE DRAWINGS

The invention will be explained in greater detail on the basis of the drawing. The drawing shows.

DETAILED DESCRIPTION

Figure 1:
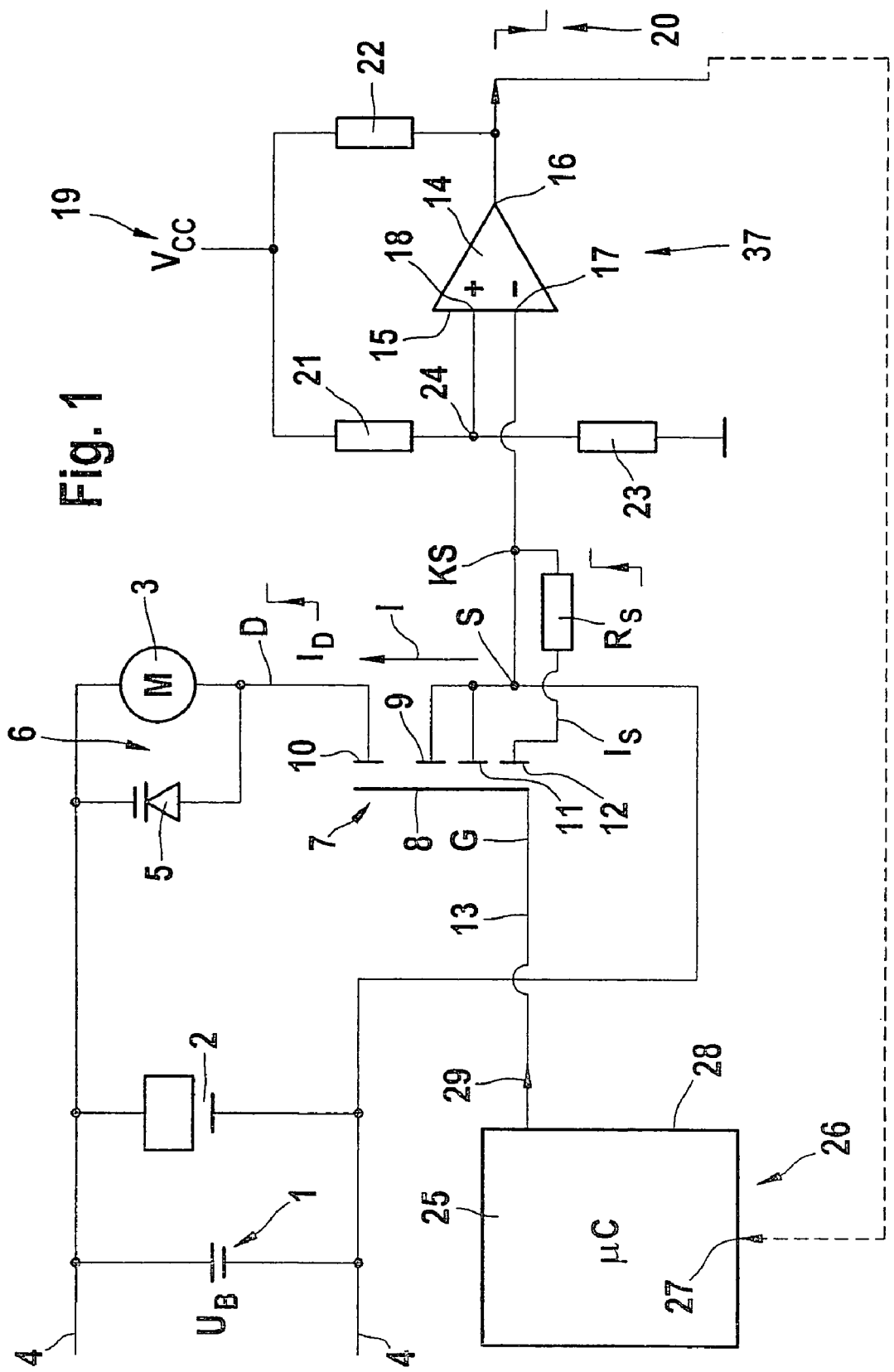
FIG. 1 A schematic circuit diagram of an evaluation circuit to detect excess current of an electric drive FIG. 2 An expanded evaluation circuit with a voltage tap between the power semiconductor component and comparator.

FIG. 1 depicts the schematic circuit diagram of an evaluation circuit to detect excess current of an electric drive.

An energy store integrated into a vehicle onboard network 4 in the form of a vehicle battery represents a voltage source 1. Connected in parallel with the voltage source 1 is a capacitor 2, which can be used to smooth voltage spikes or voltage variations within the onboard network 4 of a vehicle. An electric drive 3, which drives e.g., the fan wheel of a motor cooling fan, is accommodated in the onboard network 4. In the schematic circuit diagram in accordance with FIG. 1, the triggering of the electric drive 3 takes place via a first power semiconductor component, which can be embodied as a MOSFET or as a bipolar transistor or comparable power semiconductor component. The free-wheel of the electric drive 3 is realized by a free-wheeling diode 5 accommodated in a free-wheeling circuit 6.

The first power semiconductor component 7, e.g., embodied as a MOSFET transistor 7, includes a transistor base 8 (G), which has a source gate 9 (S) as well as a drain gate 10 (D) arranged opposite from it. The triggering of the electric drive 3 takes place via a triggering of the transistor base 8 (G) of the first power semiconductor component 7 via a triggering line 13. If the electric drive 3 to drive a fan wheel of a motor cooling fan is supposed to be operated in a partial load range, the first power semiconductor component 7 is triggered by means of a PWM signal<100% that is output in the triggering line 13. If the electric drive 3 in accordance with the schematic circuit diagram 1 is operated at full load, however, the triggering of the electric drive 3 takes place via the first power semiconductor component 7 by means of a PWM signal 29 of 100%, which in this case is applied to the triggering line 13 of the transistor base 8 (G).

In the depiction in accordance with FIG. 1, the triggering of the transistor base 8 (G) of the first power semiconductor component 7 takes place via a pulse width signal 29, which is issued by a micro-controller 25 (μC) on its output side 28. The micro-controller 25 (μC) includes on an input side 26 an input to count pulses detected in an evaluation circuit 37, which pulses can be present as edge changes 20 for example.

A sluggishness or a blocking of the electric drive 3 can be established by indirect detection of excess current. A blocking or a sluggishness as well as the speed of the electric drive 3 can be detected from the current I or from the current form or from the voltage pulses of the current derived from the current form when controlling the first power semiconductor component 7. When the electric drive 3 is operating perfectly, every switching through of the first power semiconductor component 7 in the course of the PWM triggering line generates a current I, which flows over the first power semiconductor component 7. The electronic component being used as the first power semiconductor component 7 is preferably a current-sensing electronic component (SENSEFET). The current I flowing over the first power semiconductor component 7 in accordance with the triggering by the PWM signal generates pulses that can be evaluated or counted. A first tap 11 or a second tap 12 are allocated to the first power semiconductor component 7 to detect the currents occurring when switching through the first power semiconductor component 7, via which taps voltage pulses can be supplied from the current form or the current I to the evaluation circuit 37.

The evaluation circuit 37 depicted schematically with its essential components in FIG. 1 includes a comparator component 14. Located on the input side 15 of the comparator component 14 is a first comparator input 17 (−) and a second comparator component 18 (+). The first comparator component 17 is connected with the first tap 11, while a supply voltage is applied to the second comparator component 18. Reference number 16 identifies the output of the comparator component 14. A comparator component 14 being acted upon with a bias voltage 19 $V_{cc}$ is preferably used as the comparator component 14 within the evaluation circuit 37. The application of voltage to the comparator component 14 by a bias voltage 19 ($V_{cc}$) ensues via a first resistor 21 ($R_1$), a resistor 22 ($R_2$) connected in parallel with this as well as third resistor 23 ($R_3$), which is in series with the first resistor 21. The bias voltage 19 ($V_{cc}$) is transmitted to the comparator component 14 on the input side 15 at the second comparator input 18; a terminal 24 forms the connection location. The threshold input voltage of the comparator component 14 is preset via the bias voltage 19 ($V_{cc}$) that is acting upon the comparator component 14. The to-be-sensed current 1s is detected at the second tap 12. The to-be-sensed current $I_S$ flows through a resistor $R_S$ ($R_{sense}$), which is connected at KS with the line that leads to the first comparator input 17. KS represents a temperature detection point with respect to the first power semiconductor component 7. If this threshold input voltage, which in the case at hand is output to the second comparator input 18 (+), is exceeded by a detected voltage value, then the comparator component 14 switches over its output 16. Switching over the output 16 is identified by an edge change 20. This edge change 20 can be detected by the micro-controller 25 (μC) and counted by it. To do this, the edge changes 20 occurring at the output 16 of the biased comparator component 14 are output to an input 27 on the input side 26 of the micro-controller 25 (μC).

If the electric drive 3 in accordance with the schematic circuit diagram in FIG. 1 is operated in a partial load range, i.e., with a PWM timing signal <100%, a normal operating state ensues; thus the number of edge changes 20 representing the detectable pulses is A1. This number of edge changes 20 occurring in normal operation of the electric drive 3 is stored in the micro-controller 25 (μC) and represents a reference value. If, in the evaluation circuit 37, a number of pulses, i.e., edge changes 20 at the output side 16 of the biased comparator component 14, A1* is transmitted to the input 27 of the micro-controller 25 (μC), then a comparison takes place between the number of edge changes 20 A1 occurring in normal operation and the detected number of edge changes 20 A1*. If the number A1* of edge changes 20 exceeds the number A1 of to-be-expected edge changes 20 in normal operation of the electric drive 3 within a presettable window of time, a conclusion can be drawn that there is a defect either at the first power semiconductor component 7, at the electric drive 3 as well as in the free-wheeling circuit 6. There can also be a defect in the electrical connections. When it is established that the to-be-expected number A1 of pulses has been fallen short of by the actually detected number A1* of edge changes 20, the flow of current to the electric drive 3 is interrupted by halting the triggering via a PWM signal 29. A defect at the first power semiconductor component 7 can, e.g., be an intermittent or permanent high impedance of the first power semiconductor component that is independent of triggering.

With full triggering of the electric drive 3 with a PWM timing signal 29 of 100%, the PWM timing signal is cyclically reduced for a short period of time to 99% for example. In normal operation with this PWM timing signal, a number A2 of pulses, i.e., edge changes 20, ensues per time interval. The to-be-expected number A2 of edge changes 20 in normal operation of the electric drive 3 in full load operation is also saved within the micro-controller 25 (μC). In this operating state, from now on the number of edge changes 20, A2* detected by the evaluation circuit 37, i.e., at the output 16 of the comparator component 14, is compared with the number A2 of edge changes 20 valid for normal operation that is stored in the micro-controller 25 (μC). If, in the case of this comparison, the to-be-expected number of edge changes 20, A2 is also fallen short of by the detected number of edge changes 20 A2*, then the conclusion can be drawn that there is a defect at the first power semiconductor component 7, at the electric drive 3 in the free-heeling circuit 6 or at an electrical connection. Then the flow of current to the electric drive 3 is halted via the micro-controller 25.

Figure 2:
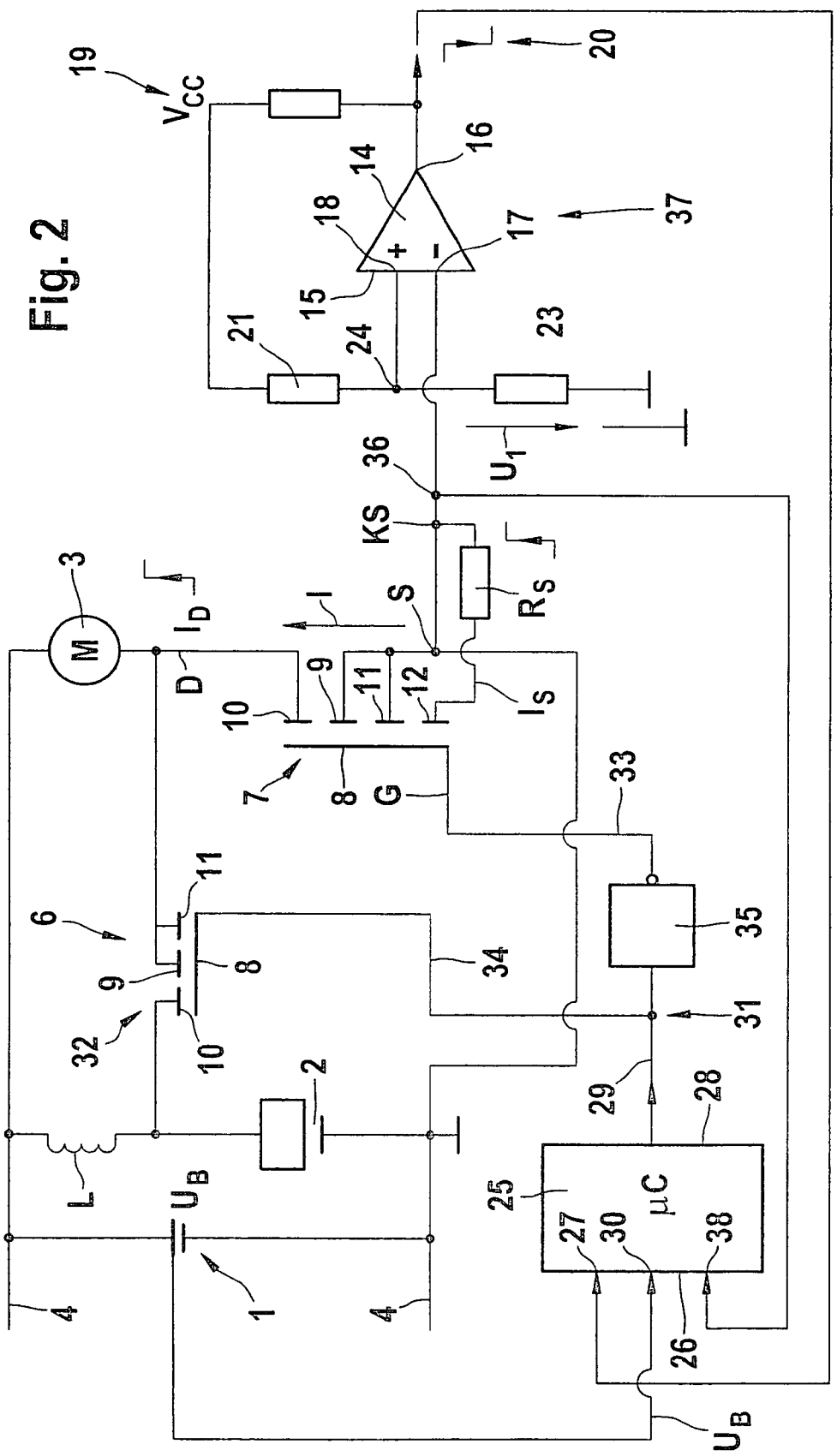

FIG. 2 depicts an expanded evaluation circuit with a voltage tap between a first power semiconductor component in a biased comparator component of the evaluation circuit.

In the embodiment in accordance with FIG. 2, an inductance designated by L is contained in the free-wheeling circuit allocated to the electric drive 3. In addition, the free-wheeling circuit 6 allocated to the electric drive 3 includes a second power semiconductor component 32. Analogous to the depiction in Figure 1, the voltage source 1 is integrated into the onboard network 4 of a vehicle, e.g., a motor vehicle (not shown here in more detail). The inductance as well as the capacitor 2 are connected in parallel to the voltage source 1. The triggering of the electric drive 3 is accomplished via the first power semiconductor component 7, which can be embodied, e.g., as a MOSFET or as a bipolar transistor. Its transistor base 8 (G) is acted upon by a PWM signal 31 via the triggering line 13. Analogous to the depiction in FIG. 1, the first power semiconductor component 7 includes a drain gate 10 (D) as well as source gate 9 (S). The current adjusting at the first power semiconductor component 7 is indicated by the arrow designated by I and adjusts at the first power semiconductor component 7 in accordance with the PWM timing signal 31. Allocated to the first power semiconductor component 7 are the first tap 11 and the second tap 12, via which the current, the current form or voltage pulses detected from the current form are supplied to the evaluation circuit 37. The evaluation circuit 37 essentially corresponds to the evaluation circuit in the schematic circuit diagram shown in FIG. 1. Also in the evaluation circuit 37 shown in FIG. 2, a voltage 19 (Vcc) acts upon the comparator component 14. The pulses generated at the first tap 11 or at the second tap 12 arise from the switching through of the first power semiconductor component 7 in the course of triggering by the PWM timing signal 31, in which a current I adjusts via the first power semiconductor component 7, which current represents a pulse that can be evaluated or counted. Designated by $I_D$ is the current in the drain branch 10, which flows in accordance with the PWM timing signal. The evaluatable or countable pulses arising from the flow of current through the first power semiconductor component 7 are supplied via the first tap 11 or the second tap 12 to the first comparator input 17 (−) or the second comparator input 18 (+). The current 1s detected at the second tap 12 flows via a resistor $R_S$, which is connected at KS to the line leading to the first comparator input 17 (−). The connecting point KS simultaneously represents a temperature detection point (Kelvin source) for the first power semiconductor component 7.

In contrast to the evaluation circuit 37 in accordance with the schematic circuit diagram shown in FIG. 1, an absolute voltage tap 36 is allocated to the first tap 11. The absolute value of the voltage $U_1$ of the first power semiconductor component 7 can be detected at the absolute voltage tap 36. In the case of a blocking or a sluggishness of the electric drive 3, the absolute value of the voltage $U_1$ will exceed a limit voltage $U_{1, Limit}$. The detected absolute value of voltage $U_1$ is supplied to an input 38 of the micro-controller 25. If the voltage $U_1$ detected at the absolute voltage tap 36 exceeds the permissible voltage value $U_{1, Limit}$, the flow of current to the first power semiconductor component 7 can be halted by the micro-controller 25 via the triggering line 29. The limit voltage $U_{1, Limit}$ is a function of the PWM signal 31, with which the first power semiconductor component 7 as well as the second power semiconductor component 32 contained in the free-wheeling circuit 6 are triggered. Furthermore, the limit voltage $U_{1, Limit}$ is also a function of the supply voltage $U_B$ of voltage source 1. As a result, the voltage $U_B$ of the voltage source 1 is supplied to the micro-controller 25 (μC) at an input 30, in addition the PWM timing signal is supplied to the micro-controller 25. The PWM signal influencing the limit voltage $U_{1, Limit}$ is directed according to whether the electric drive 3 is operated in the partial load range or in the full load range.

In contrast to the embodiment of the free-wheeling circuit 6 depicted in FIG. 2, the free-wheeling circuit 6 in accordance with FIG. 2 contains the second power semiconductor component 32. Consequently, the PWM timing signal 31 is output in parallel to a first PWM triggering branch 33 for the first power semiconductor component 7 as well as to a second PWM triggering branch 34 for triggering the second power semiconductor component 32. In one of the PWM triggering branches 33 or 34 (in the embodiment in FIG. 2) an inverter component 35 is accommodated in a first PWM triggering branch 33 in order to make alternating triggering of the first power semiconductor component 7 and of the second power semiconductor component 32 accommodated in the free-wheeling circuit 6 possible. The first power semiconductor component 7 for triggering the electric drive 3 in the partial load or in full load range is consequently operated alternatingly with the second power semiconductor component 32, which is accommodated in the free-wheeling circuit 6 of the electric drive 3.

In both embodiments, the method proposed in accordance with the invention makes the detection of a blocking or a sluggishness of an electric drive 3 possible. The speed of the electric drive 3 can also be specified using the proposed method. The proposed method in accordance with the embodiments in FIG. 1 or 2 makes the integration of a shunt, which generates dissipation power and therefore produces heat, superfluous. In addition, any falsifications with respect to the reception of pulses that arise from the electric wiring as well as from the switching behavior of the power semiconductor components 7, 32 are circumvented.

The invention claimed is:

1. A method to detect sluggishness or blocking of an electric drive (3) which is triggered via a first power semiconductor component (7) and can be operated in a partial load range (PWM<100%) and in a full load range (PWM=100%) as a function of the timing of a PWM signal (29, 31) and having an evaluation circuit (37) connected with a micro-controller (25), wherein pulses generated within a time interval are detected in the evaluation circuit (37) from current I flowing over the first power semiconductor component (7) and detected pulses are compared with normal operation number of pulses, and wherein the triggering of the electrical drive (3), having a free-wheeling circuit (6) containing a second power semiconductor component (32), takes place via the PWM signal (29, 31), which is output to a first PWM triggering branch (32) and a second PWM triggering branch (34) for alternating triggering of the power semiconductor components (7, 32).

2. Method according to claim 1, characterized in that the current I flowing in accordance with the PWM signal (29, 31) with each switching of the first power semiconductor component (7) generates pulses that can be evaluated, and supplied via taps (11, 12) to the evaluation circuit (37).

3. Method according to claim 2, characterized in that the number of pulses supplied to the evaluation circuit (37) are compared with normal operation number of pulses.

4. Method according to claim 2, characterized in that pulses detected by the taps (11, 12) are supplied to a comparator component (14) of the evaluation circuit (37).

5. Method according to claim 4, characterized in that the comparator component (14) is acted upon by a current Vcc (19).

6. Method according to claim 5, characterized in that the current Vcc (19) effects one of the inputs (17, 18) of the comparator comparator (14).

7. Method according to claim 4, characterized in that the pulse inputs (17, 18) of the comparator component (14) are detected at the first power semiconductor component (7) and, wherein the comparator component switches over its output (16) when a natural voltage Vcc is exceeded.

8. Method according to claim 7, characterized in that the number of edge changes (20) occurring when switching over the output (16) is supplied to an input (27) of the micro-controller (25).

9. Method according to claim 8, characterized in that during partial load operation (PWM timing signal <100%) of the electric drive (3), the number of edge changes (20) detected in the evaluation circuit (37) is compared in the micro-controller (25) with the to-be-expected number of edge changes (20).

10. Method according to claim 8, characterized in that during full load operation (PWM timing signal=100%) of the electric drive (3), the PWM signal (29, 30) is cyclically switched to a reduced PWM signal and the number of edge changes (20) detected in the evaluation circuit (37) is compared in the micro-controller (25) with the normal operation number of edge changes (20).

11. Method according to claim 9, characterized in that when the detected number of edge changes (20) falls short of the normal operation number of edge changes (20) it is concluded that there is a defect at the first power semiconductor element (7) at the electric drive (3) in a free-wheeling circuit and the flow of current to the electric drive (3) is halted.

12. Method according to claim 1, characterized in that the triggering of an electrical drive (3), to which a free-wheeling circuit (6) containing a second power semiconductor component (32) is allocated, takes place via a PWM signal (31), which is output to a first PWM triggering branch (32) and a second PWM triggering branch (34) for alternating triggering of the power semiconductor components (7, 32).

13. Method according to claim 1, characterized in that the PWM signal (31) is inverted in one of the PWM triggering branches (33, 34).

14. Method according to claim 2, characterized in that an absolute value of a voltage $U_1$ is detected at one of the taps (11, 12) allocated to the first power semiconductor component (7) and output to the micro-controller (25) on the input side.

15. Method according to claim 14, characterized in that a comparison of the detected absolute value of voltage $U_1$ takes place in the micro-controller (25) to a limit voltage $U_{1,\,Limit}$ with an adaptation of the limit voltage $U_{1,\,Limit}$ to the PWM signal (29) and the supply voltage $U_B$ of the voltage source (1).

16. Method according to claim 1, characterized in that the current flowing at one of the gates (9, 10) of the first power semiconductor component (7) is supplied via a resistor ($R_S$) to the evaluation circuit (37).

17. Method according to claim 10, characterized in that when the detected number of edge changes (20) falls short of the normal operation number of edge changes (20), the conclusion is drawn that there is a defect at the first power semiconductor element (7); at the electric drive (3) in a free-wheeling circuit and the flow of current to the electric drive (3) is halted.

* * * * *